United States Patent Office 3,431,189
Patented Mar. 4, 1969

3,431,189
METHOD OF MAKING AN EXPANDED CELLULAR BODY OF POLYMER
Robert D. Offenhauer, Pennington, and Peter Scheiner, Princeton, N.J., assignors to Mobil Oil Corporation, New York, N.Y., a corporation of New York
No Drawing. Filed Aug. 17, 1966, Ser. No. 572,908
U.S. Cl. 204—159.18
Int. Cl. B01j 1/10; C08f 47/08
10 Claims

An expanded cellular polymer is produced by incorporating into a polymer a triazoline compound photodecomposable to produce nitrogen gas, and exposing the resulting mixture to electromagnetic radiation to decompose the compound to produce nitrogen gas that is trapped in the polymer to form a multiplicity of gas-filled cavities thereby producing the expanded cellular polymer.

This invention relates to an expanded cellular body of polymer and particularly to a method of producing the same comprising incorporating in a body or mass of polymer an agent that decomposes to form a gas which is entrapped by the body or mass and which expands the same to form a cellular structure. The method is particularly characterized by the fact that the agent is photodecomposable upon exposure to ultraviolet radiation.

Among other advantages, the invention enables a cellular body or mass to be prepared from polymers that are not as thermally stable as others, because the photodecomposition step does not increase the temperature of the body to any substantial extent, and there is thus no risk of thermal decomposition of the polymer. Also, the invention is applicable to thermosetting as well as thermoplastic polymers. Besides being useful for making cellular or "foamed" polymers, the invention is advantageous in photocopying, wherein a mark, such as that made in the polymer by gas bubbles, may be formed in a surface of the polymer in accordance with the prior deposition of the photosensitive agent in selected areas of the surface. Still another advantage relates to the use of the agent-impregnated polymer as a detector of radiation, the appearance of gas bubbles showing that there has been an interaction of the radiation with the agent.

The expression "cellular body" or "polymer body" is intended to refer not only to shaped structures or articles of polymer but also to masses of cellular or polymer material in bulk form or in fabricated or semi-fabricated form.

In its essence the invention comprises the steps of incorporation in the polymer body a photosensitive compound selected from the group comprising 1,2,3-delta²-triazoline and derivatives thereof, exposing the resulting mixture to, preferably, ultraviolet radiation for a time sufficient to decompose said compound to produce nitrogen gas, said gas becoming entrapped in the body of polymer to form a multiplicity of tiny gas-filled cavities, and thereby producing an expanded or foamed cellular body.

Considering the invention in more detail, the method is applicable to bodies made from any suitable polymer, including thermoplastic and thermosetting materials. Some useful polymers are polystyrene; polystyrene-divinylbenzene copolymer; polyvinyls such as polyvinyl chloride and copolymers of vinyl chloride and vinyl acetate; polyacrylonitrile; polyurethanes; polyamides; polyesters; alkyds; cellulose polymers like cellulose esters, cellulose ethers, viscose, etc. Also polyalkylmethacrylates; and copolymers of alkylmethacrylate and styrene. Other polymers are the polyolefins like polyethylene, polypropylene, polyisobutylene, etc. Also acetal polymers and peptide polymers. Plasticizers may or may not be mixed with the polymer. Whatever polymer is chosen, it should have sufficient transparency to permit absorption of the radiation.

The photosensitive compound is 1,2,3-delta²-triazoline or a derivative of the same. These compounds are readily photodecomposable by the radiation herein described, yielding nitrogen gas and an aziridine. The photolytic conversion of a triazoline to an aziridine may be illustrated by the following equation:

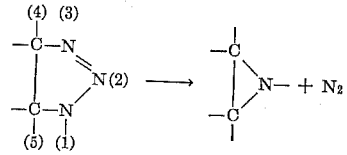

When the dangling valences are satisfied by hydrogen, the reactant in the equation is 1,2,3-delta²-triazoline and the product, aside from nitrogen, is aziridine. The numbers in parentheses identify the various atoms in the 1,2,3-delta²-triazoline molecule, and it will be seen that substitution is possible at the 1, 4, and/or 5 positions. For purposes of the invention, useful derivatives include those having substituents in one or more of the foregoing positions. Preferred substituent groups include alkyl like methyl, ethyl, propyl, cyclopropyl, vinyl, butyl; halogen like chloro, bromo, fluoro, etc.; aryl like phenyl, naphthyl, benzyl, etc.; acyloxy like acetoxy; acyl like acetyl; aryloxy like phenoxy; carbalkoxy like carbethoxy; substituted alkyl like triphenylmethyl, aminomethyl; substituted aryl like benzenesulfonyl, aminophenyl, anisyl, azidophenyl, etc. Also miscellaneous groups such as keto, hydroxyl, cyano, trimethylsilyl, mercapto, and the like.

Specific triazolines suitable for use in the invention may be listed as follows:
1-p-bromophenyl-5-hexyl-delta²-1,2,3-triazoline
1-phenyl-1,2,3-delta²-triazoline-4-carboxamide
1-benzenesulfonyl-4,5-dichloro-delta²-1,2,3-triazoline
4-acetoxy-5-phenoxy-1-vinyl-delta²-1,2,3-triazoline
4-benzyl-4-bromo-1-methyl-5-vinyl-delta²-1,2,3-triazoline
7-m-aminophenyl-2-trimethylsilyl-2,3,4,7,-tetraazabicyclo-[3.3.0] oct-3-ene-6,8-dione
1-chlorocarbonyl-4-carboxamido-5-cyclopropyl-delta²-1,2,3-triazoline
1-bromo-2-cyano-2,3,4-triaza-8-thiabicyclo [3.3.0] octa-3,6-diene
2,3-(1-carbethoxy-delta²-1,2,3-triazolino) benzofuran
1-formyl-11-oxa-2,9-bis-triphenylmethyl-2,3,4,7,8,9-hexaazatricyclo [5.5.0¹,⁵.0⁶,¹⁰] undeca-3,7-diene
2-acetyl-1,5-difluor-6,6,7,7-tetrachloro-2,3,4-triazabicyclo [3.2.0] hept-3-ene
5,5-diphenyl-4-keto-1-methanesulfonyl-delta²,1,2,3-triazoline
1-alpha-naphthyl-4-(N-pyrrolidin-2-on-yl)-delta²-1,2,3-triazoline
1-(N-morpholine)-2-thiobenzoyl-2,3,4-triazabicyclo-[3.3.0] oct-3-ene
1-(9-acridinyl)-4-mercapto-delta²-1,2,3-triazoline
4-aminomethyl-5-p-anisyl-5-methyl-delta²-1,2,3-triazoline-1-acetic acid
7-carboxamido-7,8,9-triazabicyclo [4.3.0] nona-3,8-diene-2,5-dione
2-(2-propyl)-1-hydroxy-2,3,4-triazabicyclo [4.2.0] nona-3-en-9-one
R-(2-hydroxy-3-butenyl)-2,3,4-triaza [4.4] spiro-non-3-ene
1-cyclopropyl-4-p-toluenesulfonyl-delta²,1,2,3-triazoline
3-(p-azidophenyl)-2,9,9-trimethyl-3,4,5-triazatricyclo-[6.1.1.0²,⁶] dec-4-ene
1,1-bis-(N-delta²-1,2,3-triazolino) ferrocene
5-oxa-10,11,12-triazatricyclo [7.3.0⁴,⁶.0¹,⁹] dodec-10-ene
N-(3,4,5-trinitrobenzenesulfonyl) thiatriazalinethione
1,3-bis-(N-delta²-1,2,3-triazolino)-1,3-propanedione 1,2-bis-(4,5-dicarboxy-N-delta$^2$-1,2,3-triazolino)ethane
4,5-(delta$^2$-1,2,3-triazolino) testosterone
Tetrakis-(1-phenyl-delta$^2$-1,2,3-triazolino) vitamin A
N,N$^1$,N$^2$-tritriazolinothiophosphoramide
2,4,6-tri(N-delta$^2$-1,2,3-triazolino)-1,3,5-triazine
N,N-diethyl-N$^1$-morpholino-N$^2$-(4,4,5,5-tetracyano-delta$^2$-1,2,3-triazolino) phosphoramide Representative preparatory methods for these compounds may be found in J. Organic Chemistry 30, 7–10 (1965).

The photosensitive compound or agent is used in a concentration of 0.01 to 50 or 60%, preferably 1 to 25%, by weight of the polymer. In order to secure good distribution, the compound is preferably added to the polymer while the latter is in a liquefied state, although it is also feasible to mix the two in finely divided solid form followed by homogenizing, as by melting the particles or dissolving them and removing the solvent. The placing of a polymer body in a "liquefied" state is intended to mean that it is liquid by virtue by being heated above its melting point or by solution in a solvent. According to one procedure, the compound may be incorporated in the polymer by melting both together. If the melting point of either is so high as to incur the risk of decomposition, one or the other, preferably the higher melting component, may first be dissolved in a suitable inert solvent before mixing with the other component, after which the mixture may be liquified by melting the solid component. In some cases both components may be dissolved in either the same inert solvent, as is preferred, or in different inert solvents, and liquefication achieved in this way.

Suitable inert solvents for the photosensitive compound include conventional compounds like acetone, toluene, p-dioxane, dimethyl formamide, dimethyl sulfoxide, methyl and ethyl acetates, tetrahydrofuran, pentane, hexane, heptane, low molecular weight alkanols like ethanol, low molecular alkylene glycols, like ethylene glycol, and the like. Solvents having a basic or neutral action to litmus are preferred. The foregoing solvents are not only inert but are readily removed from the material by evaporation under reduced pressure.

Suitable polymer solvents depend of course on the polymer employed, but for each polymer one or more conventional solvents are available. For example, polystyrene dissolves in toluene; polymethacrylate in methyl ethyl ketone; polyvinyl chloride in hexane; vinyl chloride-vinyl acetate in methyl ethyl ketone or ethyl acetate; polyacrylonitrile in dimethyl formamide, alkyds in benzene; cellulose esters and ethers in ethyl acetate or acetone; polyolefins in hexane; polyesters in anisole, etc.

The liquefied mixture tends to be a viscous and/or gel-like material so that care should be exercised to see that the photosensitive compound is well distributed therein; this result may be accomplished by careful agitation. The mixture is then solidified as by cooling or by removing the solvent. The latter step may usually be performed simply by placing the mixture under a suitable vacuum and collecting the solvent.

Photodecomposition is carried out by exposing the mixture to electromagnetic radiation consisting essentially of one or more wave lengths in the range of 1000 to 6000 Angstrom units. The preferred radiation is ultraviolet having a wave length in the range of 1000 or 2000 to 3850 Angstrom units. Any suitable source of radiation may be used, preferably a photochemical lamp like Hanovia, Type A, of 550 watts, or a Delmar Scientific Laboratories lamp, model DM–580; and the like. During application of the radiation, it is preferred to maintain the mixture at or near room temperature, and if necessary, cooling is used. The time of exposure is variable but generally may extend from a period of a few seconds up to several hours. A suitable time period may be determined by a trial run or two in the case of any given polymer and photosensitive compound. Besides nitrogen, the only other product of the photodecomposition is the aziridine compound, which is usually a light-colored material innocuous to the polymer; furthermore, its concentration is so small that it can be left in the polymer. It may be pointed out, however, that with a cross-linkable polymer, the aziridine compound so produced may desirably act to cross link the polymer.

It is found that the nitrogen gas formed in the photodecomposition reaction is trapped by the polymer, which does not let the gas escape but rather holds it so that tiny gas-filled cavities form, as a result of which the mixture expands considerably. By virtue of its plasticity, or deformability, the polymer permits bubbles of nitrogen gas to form therein, good distribution of the same being secured by the good distribution therein of the photosensitive compound.

The product has a fine cellular structure, as demonstrated by sectioning and observing it visually. It is a resilient material and spongy to the touch, with a volume or bulk considerably larger than that of the initial polymer material.

The intensity of the radiation should be sufficient to decompose the photosensitive compound. It may be noted, in passing, that it is possible to vary the intensity and thus to produce variations in the polymer product, such as a product having areas that are intermittently foamed and which are the result of intermittently reducing the radiation intensity.

The following example may illustrate the invention.

Example

A solution of 1.0 g. of polystyrene in 5.0 g. of toluene was prepared and to it there was added 0.5 g. of 3-phenyl-3,4,5-triazatricyclo[5.2.1.0$^{2,6}$]dec-4-ene (named according to the system used by Chemical Abstracts), after which the solution was applied to a glass slide. The coated slide was dried over a period of 15 hours, producing a transparent film thereon, and the slide was exposed to ultraviolet radiation for a period of 45 minutes. The light source was a Hanovia, 550 watt, medium pressure mercury lamp, with the slide placed 10 cm. away. The temperature of the slide was maintained at 25° C. by means of a water bath. At the conclusion of the step, the film on the slide had become foamed so as to resemble a cellular strip composed of uniformly small cells. The strip was spongy to the touch.

In other experiments aluminum foil and "Teflon" (polytetrafluoroethylene) sheets were substituted for the glass slide and were coated with the same polymer solution. They were then exposed to the lamp in the same way and produced similar cellular strips.

It will be understood that the invention is capable of obvious variations without departing from its scope.

In the light of the foregoing description, the following is claimed:

1. Method of making an expanded cellular body of polymer which comprises incorporating into a liquified polymer a photosensitive compound selected from the group consisting of 1,2,3-delta$^2$-triazoline and substituted triazolines photodecomposable to produce nitrogen gas solidifying the resulting mixture, then exposing the mixture to electromagnetic radiation of a wave length of 1000 to 6000 Angstrom units for a time sufficient to decompose said compound to produce nitrogen gas, said gas becoming trapped in the body of polymer to form a multiplicity of tiny gas-filled cavities, and thereby producing said expanded cellular body.

2. Method of claim 1 wherein said liquified polymer is prepared by melting the same, and said solidifying step comprises cooling below the melting point.

3. Method of claim 1 wherein said liquified polymer is prepared by dissolving the polymer in a solvent, and said solidifying step comprises removing the solvent.

4. Method of claim 1 wherein said compound is 1,2,3-delta$^2$-triazoline.

5. Method of claim 1 wherein said compound is a substituted triazoline photodecomposable to produce nitrogen gas.

6. Method of claim 5 wherein said triazoline is substituted in the 1, 4 or 5 positions of the heterocyclic ring.

7. Method of claim 1 wherein said compound decomposes to form, besides nitrogen gas, a product which is innocuous to said body and which remains therein.

8. Method of making an expanded cellular body of polymer which comprises incorporating in the polymer a photosensitive compound selected from the group consisting of 1,2,3-delta$^2$-triazoline and substituted triazolines photodecomposable to yield nitrogen gas and a by-product innocuous to said body, then exposing the resulting mixture to electromagnetic radiation of a wave length of 1000 to 6000 Angstrom units for a time sufficient to decompose said compound to produce said gas, trapping the gas in the body of polymer to form a multiplicity of tiny gas-filled cavities, and thereby producing said expanded cellular body.

9. Method of claim 8 wherein said compound is 1,2,3-delta$^2$-triazoline.

10. Method of claim 8 wherein said compound is a substituted triazoline photodecomposable to yield nitrogen gas.

References Cited

UNITED STATES PATENTS

| | | | |
|---|---|---|---|
| 2,971,842 | 2/1961 | Moore et al. | 260—308.1 |
| 3,378,519 | 4/1968 | Newland et al. | 260—2.5 |

MURRAY TILLMAN, *Primary Examiner.*

M. FOCLAK, *Assistant Examiner.*

U.S. Cl. X.R.

260—2.5, 308.1, 33.6, 32.8, 30.2, 30.4, 31.2, 33.4, 32.6